United States Patent [19]

Berchem

[11] Patent Number: 4,791,953

[45] Date of Patent: Dec. 20, 1988

[54] REGULATOR AND SHUT-OFF VALVE FOR CORROSIVE MEDIA

[75] Inventor: Rütger Berchem, Gelsenkirchen, Fed. Rep. of Germany

[73] Assignee: B + S Metallpraecis Gesellschaft fur Metallformgebung m.b.H., Gelsenkirchen, Fed. Rep. of Germany

[21] Appl. No.: 145,833

[22] Filed: Jan. 20, 1988

[30] Foreign Application Priority Data

Jan. 24, 1987 [DE] Fed. Rep. of Germany ....... 3702063

[51] Int. Cl.4 ............................................. F16L 7/00
[52] U.S. Cl. .................................... 137/375; 251/315; 251/368
[58] Field of Search ................ 137/375; 251/368, 315, 251/316

[56] References Cited

U.S. PATENT DOCUMENTS

| | | | |
|---|---|---|---|
| 3,921,669 | 11/1975 | Goff | 251/366 |
| 4,136,709 | 1/1979 | Rogers et al. | 251/315 |
| 4,269,391 | 5/1981 | Saito et al. | 251/368 |
| 4,337,290 | 7/1982 | Parris | 251/319 |
| 4,420,142 | 12/1983 | Dworak et al. | 137/625.41 |
| 4,503,878 | 3/1985 | Taylor | 137/375 |
| 4,505,290 | 3/1985 | Scobie | 251/173 |
| 4,575,047 | 3/1986 | Booj et al. | 137/468 |

*Primary Examiner*—A. Michael Chambers
*Attorney, Agent, or Firm*—Herbert Dubno

[57] ABSTRACT

The regulator and shut off valve for a corrosive media, particularly for a wet chlorine-containing gas and a chloride ion containing fluid, comprises a pressure resistant housing and a shut-off member held between at least two seat rings. The housing has a passage for the corrosive media. The seat rings are supported in the housing and contact the shut off member under tension. To protect against abrasion and erosion the housing is made of titanium or a titanium alloy, at least one sintered ceramic wear sleeve is provided on the circumference of the passage in the housing and the wear sleeves are inserted in the housing with radial play an with axial play so that a space is formed between the outer circumference of the wear sleeve and the housing, which is connected with the passage cross section of the wear sleeve by a compensating gap.

6 Claims, 1 Drawing Sheet

REGULATOR AND SHUT-OFF VALVE FOR CORROSIVE MEDIA

CROSS REFERENCE TO RELATED APPLICATIONS

This application is related to the commonly owned copending application Ser. Nos. 07/145,832, filed 01/20/88 and 07/128,819, filed 12/04/87.

FIELD OF THE INVENTION

My present invention relates to a regulator and shut-off valve for corrosive media and, more particularly, to a regulator and shut-off valve for a wet chlorine-containing gas and chloride ion containing fluid.

BACKGROUND OF THE INVENTION

A known regulator and shut-off valve for a corrosive media, particularly for a wet chlorine containing gas and a chloride ion containing fluid, comprises a pressure resistant housing and a shut-off member held between at least two seat rings. The housing has a passage for the corrosive media. The seat rings are supported in he housing and contact the shut-off member under stress.

Regulating and shut-off valves to which my invention can be applied include all currently marketed structural variations for these valves. It is particularly applicable to a ball valve, a wedge-shaped gate valve, a flat slider gate valve and a stopcock valve. The valve can be a single passage valve with a single entrance and outlet or also a multiple path valve such as a three way valve.

The material for the housing is selected to suit the media fed through the valve so that on the one hand the housing is corrosion resistant and on the outer hand the housing has sufficient abrasion and erosion resistance because of the higher flow speed and turbulence.

A plurality of steel alloys and a plurality of special materials are available for the housing material. Sometimes, particularly for a processing plant in the chemical industry, the properties of the available materials are not sufficient. Either the corrosion resistance of the material is not satisfactory or the material is not suitable for the housing of the valve because it has unsatisfactory mechanical properties, particularly a reduced wear resistance or a low bending and flexure moment or torque resistance.

A significant problem is the selection of a suitable material for a valve which could be used in a plant in which a wet chlorine containing gas and/or a chloride ion containing fluid is being processed.

That also is true for a plant in which boiling solutions of alkalai, alkaline earth and heavy metal salts are processed as well as organic acids. Of course it is known that titanium has a good corrosion resistance to these media; however titanium is very soft and is unsatisfactory by itself as a housing material because of insufficient wear resistance. That is also true when the material at the surface is hardened by a TiN layer. The layer thickness attained by known layering techniques is much too small and is worn away in operation much too quickly. These layers are not renewable either.

OBJECTS OF THE INVENTION

It is an object of my invention to provide an improved regulator and shut-off valve for a corrosive media, particularly for a wet chlorine containing gas and a chloride ion containing fluid, which avoids the above mentioned disadvantages.

It is another object of my invention to provide an improved regulator and shut-off valve for a corrosive media, particularly for a wet chlorine containing gas and a chloride ion containing fluid, which has a good corrosion resistance but also a satisfactory wear resistance to erosion and abrasion.

SUMMARY OF THE INVENTION

These objects and others which will become more readily apparent hereinafter are attained in accordance with my invention in a regulator and shut-off valve for a corrosive media, particularly for a wet chlorine containing gas and a chloride ion containing fluid, comprising a pressure resistant housing and a shut-off member held between at least two seat rings. The housing has a passage for the corrosive media. The seat rings are supported in the housing and contact the shut-off member under tension.

According to my invention to protect against abrasion and erosion the housing is made of titanium or a titanium alloy, at least one sintered ceramic wear sleeve is located on the circumference of the passage in the housing and the wear sleeves are inserted in the housing with a radial play and an axial play so that a space is formed between the outer circumference of the wear sleeve and the housing, which is connected with the passage cross section of the wear sleeve by a compensating gap.

My invention is based on the discovery that when the corrosive action of the media is extreme it is not possible to provide a structural element made from a material which is pressure resistant, corrosion resistant and at the same time wear resistant.

The objects of my invention can not be attained purely by material selection or optimization. Surprisingly the objects of my invention can however be obtained by a combination of structural features and material selection for those features directed toward a solution of the problem.

According to my invention a pressure resistant and corrosion resistant housing is protectable by wear resistant sleeves which are inserted in the housing to keep it free of bending or flexure moments and torques and free of loads, especially due to turbulence or hammer.

The housing is composed of titanium or titanium alloy or from a soft and nonwear resistant but corrosion resistant material and further the wear sleeve is made of a sintered ceramic material which is characterized by a high wear resistance but is nevertheless sensitive to pressure, bending moments and torques.

According to my invention the valve is constructed so that the sintered ceramic wear sleeve or sleeves protects the housing from abrasion and erosion; without that it must take those forces. The housing made of the titanium or the titanium alloy provides the corrosion resistance and takes the torques and bending forces from the adjacent pipe segments.

It is known to coat components or parts made of titanium or a titanium alloy with a thin ceramic layer. Among the known features for a valve for corrosive media the metallic material however is only a supporting body which does not come into contact with the flow media when the layer has no imperfections. The operating pressure loads the ceramic surface and bending moments and torques acting on the components are transferred to the ceramic layer. In practice such a ceramic layer is not very durable.

In contrast to the known features of this valve for corrosive media which uses a ceramic layer the wear resistant member of my invention is not subjected to pressure and the corrosive media, i.e. the media fed through the valve, comes into contact with the housing made of titanium or titanium alloy. According to my invention the corrosion resistant properties of the titanium or titanium alloy are put to use. According to my invention, moreover, the wear resistance of the sintered ceramic materials is used but the effect of pressure is kept away from the wear resistant member. The advantages of the materials are utilized by my invention and because of the structural features the disadvantages of the particular materials are avoided.

The space defined by the radial play between the wear sleeve and the housing is chosen so that a pressure balancing at the circumference of the wear sleeve is possible and the deformation of the housing because of the bending moments and torques transferred from the adjacent pipe is not transferred to the wear sleeve.

The radial play between the wear sleeve and the housing also depends on the structural length of the valve and the housing wall strength. It is particularly advantageous when the radial play between the wear sleeve and the housing is at least 0.10 mm.

The axial play of the wear sleeve is adjusted so that a pressure compensation between the space and cross section of the wear sleeve is possible. A pressure balancing gap which has a size on the order of the roughness of the material is sufficient. Advantageously the wear sleeves are inserted in the housing with an axial play of at least 0.10 mm.

The wear sleeve protects the soft housing made of titanium or a titanium alloy from abrasion and erosion because of increased flow speed and because of turbulence occurring downstream of the partially opened shut-off member.

The region of increased erosive action may be calculated with the help of fluid mechanics. It is understood that the length of the wear sleeve is correspondingly adjusted. It has proven sufficient when the length-/diameter ratio of the wear sleeve is approximately equal to or greater than one. A large wear action occurs also on the shut-off member and on the seat rings. Also the shut-off member and the seat rings can be made of a sintered ceramic material.

The invention has the advantage that the valve has a high corrosion resistance and a large wear resistance.

Since the bending moments and torques from the adjacent pipe are transferred to the housing made of titanium or titanium alloy and the wear sleeves are free of applied pressure and forces in the housing, a problem free operation of the valve according to my invention results.

In comparison to the metallic housing which has a local ceramic layer attached rigidly with the metallic material, in the regulating and shut-off valve according to my invention the danger of damage to the wear resistant component is substantially reduced.

Compared with the housing of titanium which has a hardened surface layer of titanium nitride the lifetime is substantially improved since the wear sleeve according to my invention has about a factor of 10 to 50 times larger thickness. Also the wear resistant sleeves are replaceable. The result is a very economical valve.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 2:
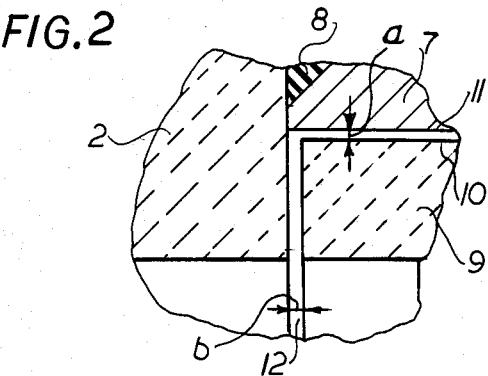
FIG. 2 is a detail of the region II thereof.
Figure 1:
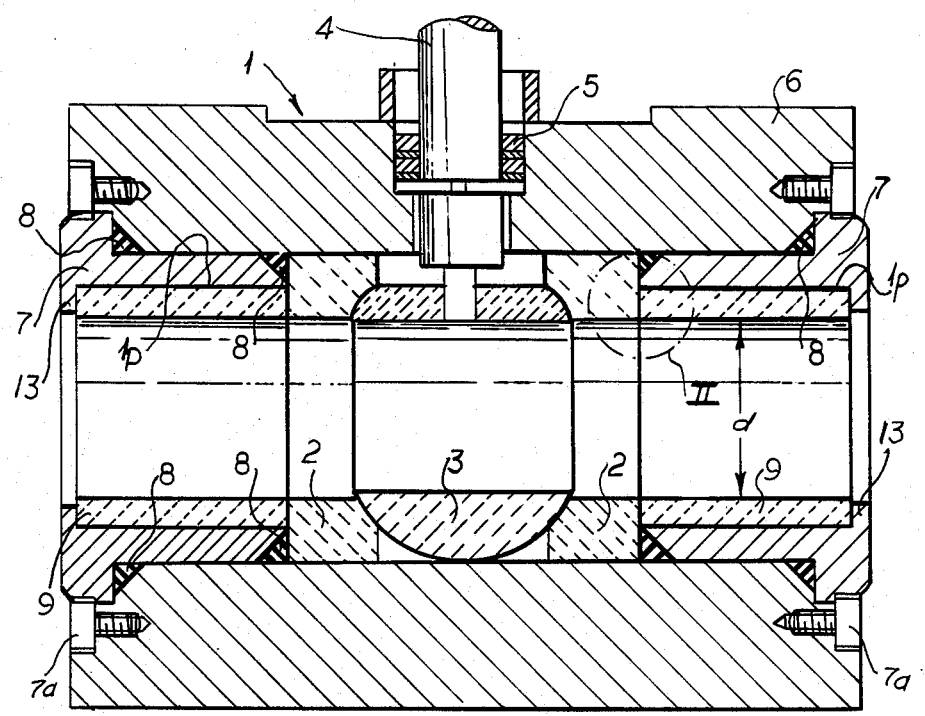
FIG. 1 i a longitudinal cross sectional view of a regulator and shut-off valve according to my invention.

The ball valve shown in the drawing is particularly suitable for use as a regulator and shut-off valve for a corrosive media. By "corrosive media" I mean particularly a wet chlorine containing gas and a chloride ion containing fluid.

This regulator and shut-off valve has a basic structure comprising a pressure resistant housing 1 with a passage 1p, two seat rings 2 and a shut-off member 3 held between the two seat rings 2. In this case the shut-off member 3 is a ball valve. The seat rings 2 are supported in the housing 1 and contact under tension on the shut-off member 3.

An operating shaft 4 which is guided through a shaft seal 5 of the housing 1 is connected to the shut-off member 3.

In the valve shown in the drawing the housing 1 comprises a one-piece outer shell 6 and two pipe connectors 7 which are mounted in the outer shell 6 with corrosion resistant seals 8 interposed.

The housing 1 including the outer shell 6 and the pipe connector 7 is made of titanium or titanium alloy.

Two sintered ceramic wear sleeves 9 are positioned on opposite sides of the ball valve on the circumference of the passage 1p of the housing 1. They are inserted with a radial play a, advantageously 0.10 mm, and with an axial play b in the housing 1 and more specifically in the pipe connectors 7.

A space 11, which is connected with a passage cross section d of the wear sleeve 9 by a compensating gap 12, is formed between the outer circumference 10 of the wear sleeve 9 and the housing I, more specifically in this example between the outer circumference 10 and the pipe connectors 7.

The compensating gap 12 is so dimensioned that the operating pressure present in the passage cross section d of the wear sleeve 9 adjusts itself at the outer circumference of the wear sleeve 9. The pressure compensating gap 12 is sufficient when in the range of the standard roughness of the surface of the wear sleeve 9. Advantageously the axial play b defining the compensating gap 12 amounts to about 0.10 mm.

The wear sleeves 9 are secured from axial slippage by a collar 13 of the pipe connector 7.

My invention however is not limited to a ball valve. In the scope of my invention the valve can be a flat slider gate valve, a wedge slide or gate valve or a ball valve. In the chemical industry the valve according to my invention is used in a special plant for making chlorine, also in plants for making acetaldehyde, nitric acid, soda (sodium carbonate), artificial manure and plastic. Because of the good corrosion resistance in regard to chlorite, hypochlorite and carbon dioxide, the shut-off and regulator valve is very appropriate for plants in the textile, cellulose, synthetic fiber and paper industries.

In the following claims and in the application I consider the housing 1 to include the pipe connectors 7 held in place by the screws 7a. The housing 1 must be assembled in such manner to effectively mount and hold the wear sleeves 9.

I claim:

1. In a regulator and shut-off valve for a corrosive media, particularly for a wet chlorine containing gas and a chloride ion containing fluid, comprising a pressure resistant housing and a shut-off member held between at least two seat rings, said housing having a passage for said corrosive media, said seat rings being supported in said housing and contacting said shut-off member under tension, the improvement wherein said housing is made of titanium or a titanium alloy, at least one sintered ceramic wear sleeve is located on the circumference of said passage in said housing and said wear sleeve is inserted in said housing with a radial play and with an axial play so that a space is formed between the outer circumference of said wear sleeve and said housing, said space being connected with the passage cross section of said wear sleeve by a compensating gap.

2. The improvement according t claim 1 wherein said radial play between said wear sleeve and said housing is at least 0.10 mm.

3. The improvement according to claim 1 wherein said wear sleeve is inserted with an axial play of at least 0.10 mm in said housing.

4. The improvement according to claim 1 wherein said wear sleeve has a length/diameter ratio of at least one.

5. The improvement according to claim 1 wherein said shut-off member and said seat rings are made of a sintered ceramic material.

6. A regulator and shut-off valve for a corrosive media, particularly for a wet chlorine containing gas and a chloride ion containing fluid, comprising:

a pressure resistant titanium or titanium alloy housing having a passage for said corrosive media;

a sintered ceramic shut-off member held between at least two sintered ceramic seat rings supported in said housing and contacting said sintered ceramic shut-off member under tension; and at least one sintered ceramic wear sleeve located on the circumference of said passage in said housing and inserted in said housing with a radial play of at least 0.10 mm and with an axial play of at least 0.10 mm so that a space is formed between the outer circumference of said wear sleeve and said housing, said space being connected with a passage cross section of said wear sleeve by a compensating gap.

* * * * *